(12) United States Patent
Eum et al.

(10) Patent No.: US 10,637,350 B2
(45) Date of Patent: Apr. 28, 2020

(54) POWER FACTOR CORRECTION CIRCUIT AND DRIVING METHOD THEREOF

(71) Applicant: SEMICONDUCTOR COMPONENTS INDUSTRIES, LLC, Phoenix, AZ (US)

(72) Inventors: Hyun-Chul Eum, Seoul (KR); Taesung Kim, Incheon (KR); In-Ki Park, Seoul (KR); Young-Jong Kim, Seoul (KR)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 0 days.

(21) Appl. No.: 15/901,228

(22) Filed: Feb. 21, 2018

(65) Prior Publication Data

US 2018/0183326 A1 Jun. 28, 2018

Related U.S. Application Data

(63) Continuation of application No. 15/077,280, filed on Mar. 22, 2016, now Pat. No. 9,935,538.

(60) Provisional application No. 62/136,884, filed on Mar. 23, 2015.

(30) Foreign Application Priority Data

Mar. 3, 2016 (KR) .................. 10-2016-0025905

(51) Int. Cl.
*H02M 1/12* (2006.01)
*H02M 1/42* (2007.01)
*H02M 3/335* (2006.01)
*H02M 1/00* (2006.01)

(52) U.S. Cl.
CPC .......... *H02M 1/4258* (2013.01); *H02M 1/12* (2013.01); *H02M 3/33523* (2013.01); *H02M 2001/0025* (2013.01); *Y02B 70/126* (2013.01); *Y02P 80/112* (2015.11)

(58) Field of Classification Search
CPC ......... H02M 3/33538; H02M 3/33546; H02M 3/33515; H02M 3/33576; H02M 3/33592; H02M 3/33553; H02M 3/33507; H02M 3/33523; H02M 1/4208; H02M 1/4258; H02M 1/42; H02M 2003/1552; H02M 1/12; H02M 1/4225; H02M 1/4233; H02M 1/4241; H02M 1/425
See application file for complete search history.

(56) References Cited

U.S. PATENT DOCUMENTS

| | | | |
|---|---|---|---|
| 2010/0270984 A1* | 10/2010 | Park | H02M 1/4225 323/211 |
| 2014/0211519 A1* | 7/2014 | Hsu | H02M 1/4258 363/21.17 |
| 2015/0200599 A1 | 7/2015 | Mao et al. | |
| 2015/0214833 A1 | 7/2015 | Ramabhadran et al. | |
| 2015/0263542 A1 | 9/2015 | Sato et al. | |
| 2015/0340954 A1* | 11/2015 | Hu | H05B 33/0815 363/21.16 |

(Continued)

*Primary Examiner* — Bryan R Perez
(74) *Attorney, Agent, or Firm* — AMPACC Law Group, PLLC

(57) ABSTRACT

A power factor correction circuit corrects a filter current flowing through a filter capacitor asymmetrically based on a peak of an input voltage by controlling a switching operation of a power switch, thereby correcting distortion of an input current.

17 Claims, 10 Drawing Sheets

(56) References Cited

U.S. PATENT DOCUMENTS

2016/0020691 A1  1/2016  Yoon et al.
2016/0087523 A1  3/2016  Liu et al.
2016/0134197 A1  5/2016  Mao et al.
2016/0226383 A1  8/2016  Hayakawa et al.

* cited by examiner

POWER FACTOR CORRECTION CIRCUIT AND DRIVING METHOD THEREOF

CROSS-REFERENCE TO RELATED APPLICATIONS

This application is a continuation of U.S. patent application Ser. No. 15/077,280, filed on Mar. 22, 2016, which claims the benefit of U.S. Provisional Application No. 62/136,884, filed on Mar. 23, 2015 and claims priority to Korean Patent Application No. 10-2016-0025905, filed with the Korean Intellectual Property Office on Mar. 3, 2016. The just-mentioned related applications are incorporated herein by reference in their entirety.

BACKGROUND

(a) Technical Field

The present disclosure relates to a power factor correction circuit and a method for driving the same.

(b) Description of the Related Art

Power factor is improved as a difference in phase between an input current of a power factor correction circuit and an input voltage of a power supply decreases. When the power factor correction circuit includes a switch mode power supply (SMPS) and an EMI filter, the input current of the power factor correction circuit is the sum of a current of the SMPS and a current of the EMI filter.

The EMI filter includes a filter capacitor which causes the EMI filter current to have a phase 90° delayed with respect to the phase of the input current. The difference in phase between the EMI filter current and the input current makes the waveform of the input current to be distorted, as compared to sine wave. As a result, the difference in phase between the input current and the input voltage and deterioration in power factor may occur.

SUMMARY

The present disclosure provides a power factor correction circuit and a method for driving the same capable of correcting distortion of an input current.

In accordance with one embodiment of the present disclosure, a power factor correction circuit includes a filter capacitor and a power supply comprising a power switch electrically connected to the filter capacitor and converting an input voltage into output power using the power switch.

The power factor correction circuit may control a switching operation of the power switch to correct a filter current flowing through the filter capacitor asymmetrically based on a peak of the input voltage.

The power factor correction circuit may further include an adjustment signal generator for generating an adjustment signal corresponding to the input voltage.

The adjustment signal generator may include a differentiator for differentiating an input detection voltage corresponding to the input voltage and an inverter for inverting an output of the differentiator.

Alternatively, the adjustment signal generator may include a reference signal generator for generating an adjustment reference signal synchronized with the input voltage and a multiplier for multiplying an input peak voltage corresponding to the peak of the input voltage by the adjustment reference signal to generate the adjustment signal.

The adjustment reference signal may have a waveform for correcting distortion of the input current by the filter current.

The power factor correction circuit may further include a duty generator for correcting a difference between a voltage corresponding to an output voltage according to the output and a predetermined reference voltage to generate an error voltage and adding the adjustment signal to the error voltage to generate a feedback signal.

In accordance with another embodiment of the present invention, a power factor correction circuit may include a filter capacitor, a primary side winding connected to the filter capacitor, a power switch connected to the primary side winding and converting an input voltage into a secondary side output and a duty generator for controlling a switching operation of the power switch to correct a filter current flowing through the filter capacitor asymmetrically based on a peak of the input voltage.

The duty generator may correct a difference between a voltage corresponding to an output voltage according to the output and a predetermined reference voltage to generate an error voltage and adding the adjustment signal corresponding to the input voltage to the error voltage to generate a feedback signal.

The duty generator may generate a sawtooth wave signal increasing with a predetermined slope in synchronization with a switching cycle of the power switch and may turn off the power switch at a time point in which the sawtooth wave signal reaches the feedback signal.

The duty generator may be synchronized with the switching cycle of the power switch, may control variation in slope in a direction reverse to a variation direction of the adjustment signal and may generate a sawtooth wave signal increasing with the controlled slope.

The duty generator may be synchronized with the switching cycle of the power switch, may control variation in beginning level in a direction reverse to a variation direction of the control signal and may generate a sawtooth wave signal beginning to increase at the controlled beginning level.

The duty generator may determine a compensation period based on the adjustment signal and may control an on-period of the power switch corresponding to the compensation period.

The duty generator may calculate the compensation period by dividing a value obtained by multiplying the adjustment signal by the switching cycle of the power switch, by a value obtained by multiplying the input voltage by the on-period of the power switch.

The duty generator may generate a compensation control output by delaying a control output based on a result of comparison between the feedback signal corresponding to the output voltage according to the output, and the sawtooth wave signal, by a period corresponding to the sum of at least one switching cycle and the compensation period.

The duty generator may generate the feedback signal by controlling the reference voltage according to the adjustment signal and may control a switching operation of the power switch based on a result of comparison between a sensing voltage corresponding to a current flowing through the power switch and the feedback signal.

The duty generator may generate a compensation sensing voltage by controlling variation in slope of the sensing voltage in a direction reverse to a variation direction of the adjustment signal and may control a switching operation of the power switch based on a result of comparison between the compensation sensing voltage and the reference voltage. The sensing voltage may be a voltage corresponding to a current flowing through the power switch.

The duty generator may generate a compensation sensing voltage by controlling variation in beginning level of the sensing voltage in a direction reverse to a variation direction of the adjustment signal and may control a switching operation of the power switch based on a result of comparison between the compensation sensing voltage and the reference voltage. The sensing voltage may be a voltage corresponding to a current flowing through the power switch.

The duty generator may generate a feedback signal based on a result of multiplication of the sum of the reference voltage and the adjustment signal by the switching cycle of the power switch, may generate a sensing voltage based on the total amount of the switch current for one switching cycle of the power switch, and may turn off the power switch based on a result of comparison between the sensing voltage and the feedback signal.

In accordance with another embodiment of the present disclosure, provided is a method for driving a power factor correction circuit comprising a power supply electrically connected to a filter capacitor, the method comprising generating an adjustment signal corresponding to an input voltage of the power supply, and correcting a filter current flowing through the filter capacitor asymmetrically based on a peak of the input voltage by controlling a switching operation of a power switch of the power supply.

The correcting a filter current may include correcting at least one of feedback information and the control signal according to the adjustment signal and turning off the power switch according to a control output based on a result of comparison between the compensated one of the feedback information and the control signal, and the other thereof.

The correcting a filter current may include generating a control output based on a result of comparison between the feedback information and the control signal, correcting the control output according to the adjustment signal, and turning off the power switch according the compensated control output.

The present disclosure provides a power factor correction circuit and a method for driving the same capable of correcting distortion amount of an input current by a filter current.

DETAILED DESCRIPTION OF THE EMBODIMENTS

Figure 1:
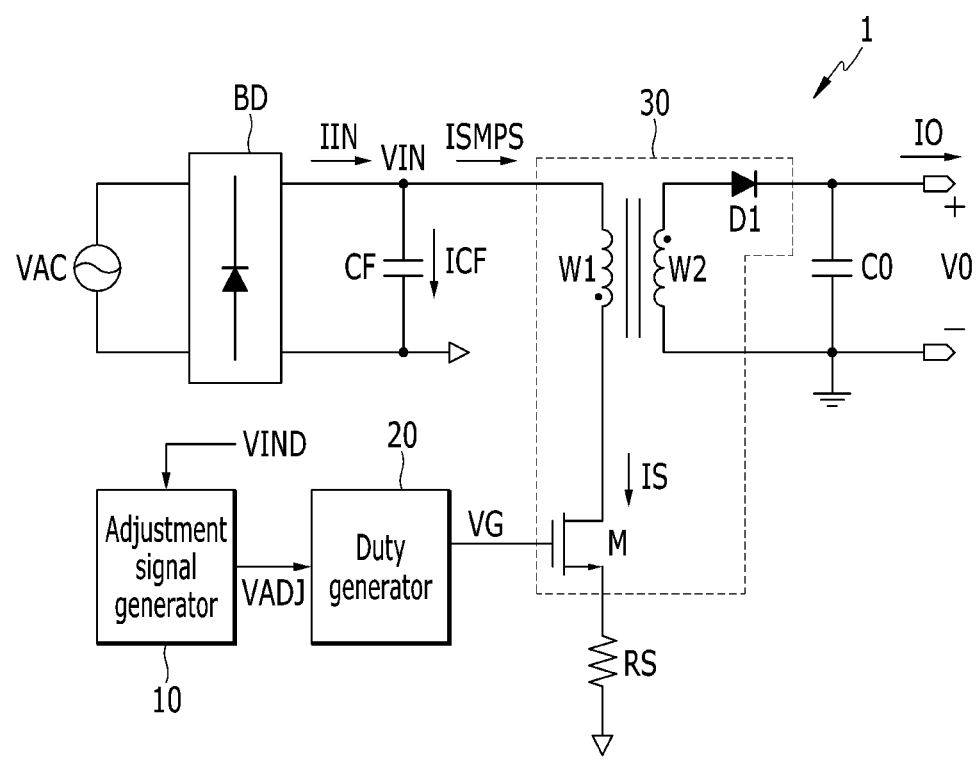
FIG. 1 is a diagram illustrating a power factor correction circuit according to an embodiment.

Hereinafter, embodiments of the present disclosure will be described in detail with reference to the accompanying drawings such that those having an ordinary knowledge in the art to which the present disclosure pertains can easily carry out the same. The disclosure may, however, be embodied in many different forms and should not be construed as being limited to the embodiments set forth herein. In addition, parts irrelevant to the description are omitted for the clarity of explanation in the drawings and like reference numerals designate like elements throughout the specification.

Throughout this specification, when it is described that an element is "connected" to another element, the element may be "directly connected" to the other element or "electrically connected" to the other element through a third element. In addition, unless explicitly described to the contrary, the word "comprise" and variations such as "comprises" or "comprising" will be understood to imply the inclusion of stated elements but not the exclusion of any other elements.

FIG. 1 is a diagram illustrating a power factor correction circuit according to an embodiment.

Referring to FIG. 1, the power factor correction circuit 1 includes a rectifier circuit BD, an adjustment signal generator 10, a duty generator 20, a rectifier diode D1, an output capacitor CO, primary and secondary side windings W1 and W2, a power switch M, a sensing resistance RS and a filter capacitor CF.

The power factor correction circuit 1 according to the embodiment of the present disclosure includes a power supply 30 for converting an input voltage VIN into an output voltage VO and FIG. 1 illustrates, as an example of the power supply 30, a flyback-type switch mode power supply (hereinafter, referred to as "SMPS"). The SMPS 30 includes the primary and secondary side windings W1 and W2, the rectifier diode D1 and the power switch M. The power supply according to the present disclosure is not limited to the flyback-type SMPS and may be other type of converter such as a boost converter, instead of the flyback-type SMPS.

The rectifier circuit BD rectifiers an alternating-current input voltage VAC to generate an input voltage VIN. The input current IIN flows through the rectifier circuit BD to the filter capacitor CF and the primary side winding W1. Hereinafter, a current flowing through the filter capacitor CF is referred to as a "filter current ICF" and a current flowing through the primary side winding W1 of the SMPS is referred to as a "SMPS current ISMPS".

Opposite terminals of the filter capacitor CF are connected in parallel to opposite terminals of the rectifier circuit BD. The input voltage VIN is supplied through the filter capacitor CF to the SMPS.

The input voltage VIN is supplied to one terminal of the primary side winding W1 and a drain of the power switch M is connected to the other terminal of the primary side winding W1. The sensing resistance RS is connected between a source and the ground of the power switch M. A gate voltage VG is input to a gate of the power switch M. A switching operation of the power switch M may control power transferred from the primary side to the secondary side, thus converting the input voltage VIN into the output voltage VO or an output current IO.

The secondary side winding W2 is electromagnetically connected to the primary side winding W1 and an anode of the rectifier diode D1 is connected to one terminal of the secondary side winding W2. When the rectifier diode D1 becomes conductive, the current flowing through the secondary side winding W2 is transmitted to a load (not shown) connected to the output capacitor COUT and an output terminal (+, −).

When the power switch M is turned on, the SMPS current ISMPS flows through the power switch M and energy is stored in the primary side winding W1 through the SMPS current ISMPS. During this period, the rectifier diode D1 is not conductive. When the power switch M is turned off and the rectifier diode D1 becomes conductive, the energy stored in the primary side winding W1 is transferred to the secondary side winding W2 and a current flowing through the secondary side winding W2 flows through the rectifier diode D1.

The adjustment signal generator 10 generates an adjustment signal VADJ based on an input detection voltage VIND corresponding to the input voltage VIN. For example, the adjustment signal generator 10 may generate the adjustment signal VADJ by inverting a result of differentiation of the input detection voltage VIND.

The filter capacitor CF enables the filter current ICF to correspond to a differential value of the input voltage VIN. In order to correct the distortion of the input current IN caused by the 90° phase delay of the filter current ICF with respect to the input voltage VIN, the filter current ICF should be compensated. For this purpose, the adjustment signal generator 10 generates the adjustment signal VADJ based on the inverting result of the differentiation result of the input detection voltage VIND.

The input detection voltage VIND may be a voltage that has the same phase as the input voltage VIN and may be a voltage obtained by controlling a level of the input voltage VIN to a predetermined ratio of 1 or less. A means for generating the input detection voltage VIND can be realized by a variety of well-known techniques such as a plurality of series-connected resistances and a detailed description thereof is thus omitted.

The duty generator 20 generate a gate voltage VG by determining a duty of the power switch M using a control output in accordance with a result of comparison between feedback information and the control signal. The feedback information and the control signal may be determined by a duty control mode and the duty control mode may include a voltage mode, a current mode, an input current calculation mode or the like. The duty generator 20 may generate the gate voltage VG by correcting one of feedback information, a control signal and a control output in the voltage mode and the current mode according to the adjustment signal VADJ, or may generate the gate voltage VG by correcting feedback information in the input current calculation mode according to the adjustment signal VADJ.

Since the power switch M is an n channel transistor, a level of the gate voltage VG that turns on the power switch M is a high level and a level of the gate voltage VG that turns off the power switch M is a low level.

The current flowing through the power switch M (hereinafter, referred to as "switch current IS") may be sensed by the sensing resistance RS. For example, the switch current IS may be sensed based on a voltage generated by the sensing resistance RS.

Hereinafter, the adjustment signal generator 10 according to an embodiment will be described with reference to FIGS. 2 to 5.

Figure 2:
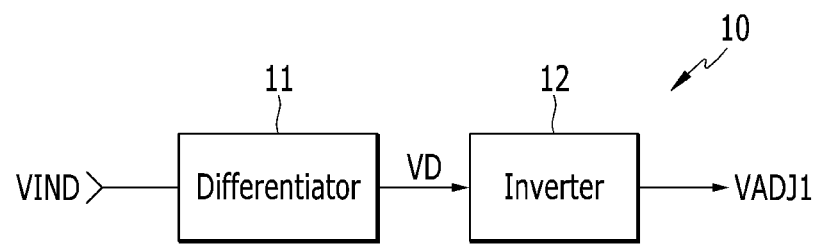
FIG. 2 is a diagram illustrating an example of the adjustment signal generator according to the present embodiment.

FIG. 2 is a diagram illustrating an example of the adjustment signal generator according to the present embodiment.

The adjustment signal generator 10 shown in FIG. 2 generates an adjustment signal VADJ1 by differentiating and inverting an input detection voltage VIND corresponding to an input voltage VIN. The adjustment signal generator 10 includes a differentiator 11 and an inverter 12.

The differentiator 11 and the inverter 12 shown in FIG. 2 may be realized by an analog circuit. The differentiator may be realized by a capacitor and a resistance connected to each other in series. In addition, the analog circuit associated with the differentiator and the inverter is well-known in the art and a description thereof is thus omitted.

Alternatively, the differentiator 11 and the inverter 12 shown in FIG. 2 may be realized by a digital circuit. The differentiator 11 may differentiate the input detection voltage VIND by sampling the input detection voltage VIND for a predetermined cycle and using the difference between the sampling result and an adjacent sampling result. In addition, the digital circuit associated with the differentiator and the inverter is well-known in the art and a description thereof is thus omitted.

The differentiator 11 differentiates the input detection voltage VIND to generate a differential signal VD and the inverter 12 inverts the phase of the differential signal VD to generate an adjustment signal VADJ1.

Figure 3:
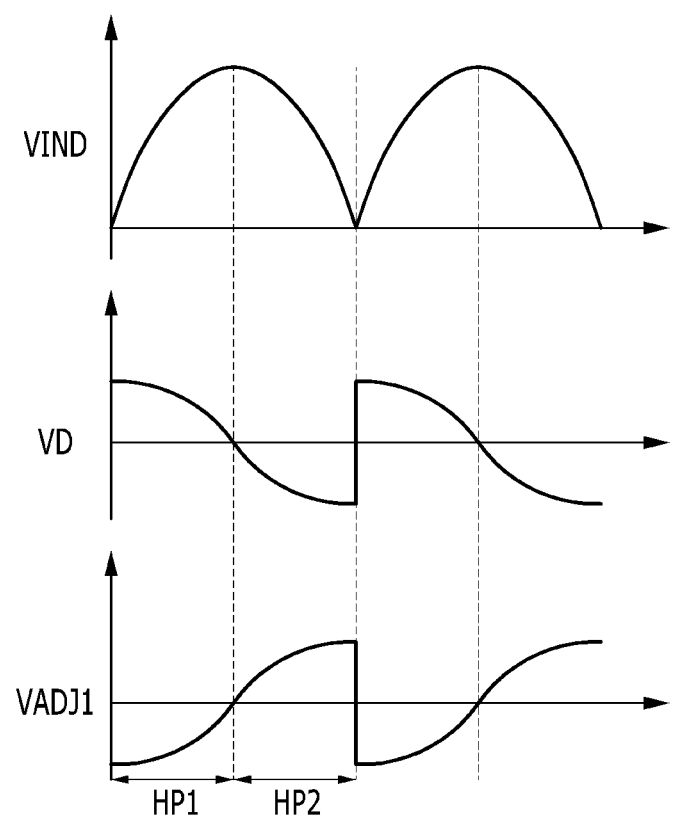
FIG. 3 is a waveform graph showing a differential signal, an adjustment signal and an input detection voltage generated according to the exemplary adjustment signal generator.

FIG. 3 is a waveform graph showing a differential signal, an adjustment signal and an input detection voltage generated according to the exemplary adjustment signal generator.

As shown in FIG. 3, an input detection voltage VIND is a full wave-rectified sine wave and a differential signal VD corresponding to one cycle of the input detection voltage VIND is a cosine wave. The inverter 12 inverts the phase of the differential signal VD to generate an adjustment signal VADJ1.

As shown in FIG. 3, the adjustment signal VADJ1 for one cycle of the adjustment signal VADJ1 is asymmetric based on the peak of the input voltage VIN.

Figure 4:
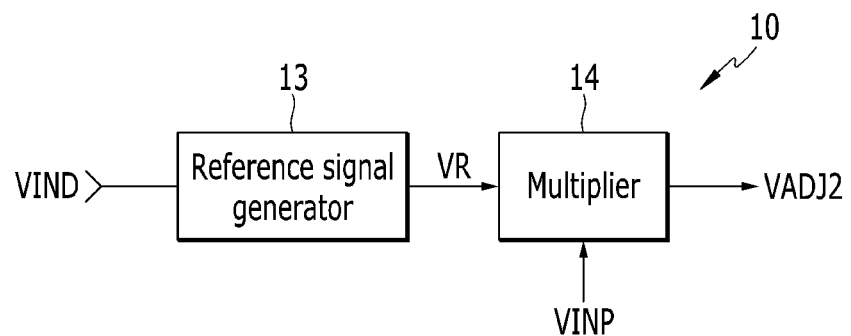
FIG. 4 is a diagram illustrating another example of the adjustment signal generator according to the present embodiment.

FIG. 4 is a diagram illustrating another example of the adjustment signal generator according to the present embodiment.

Figure 5:
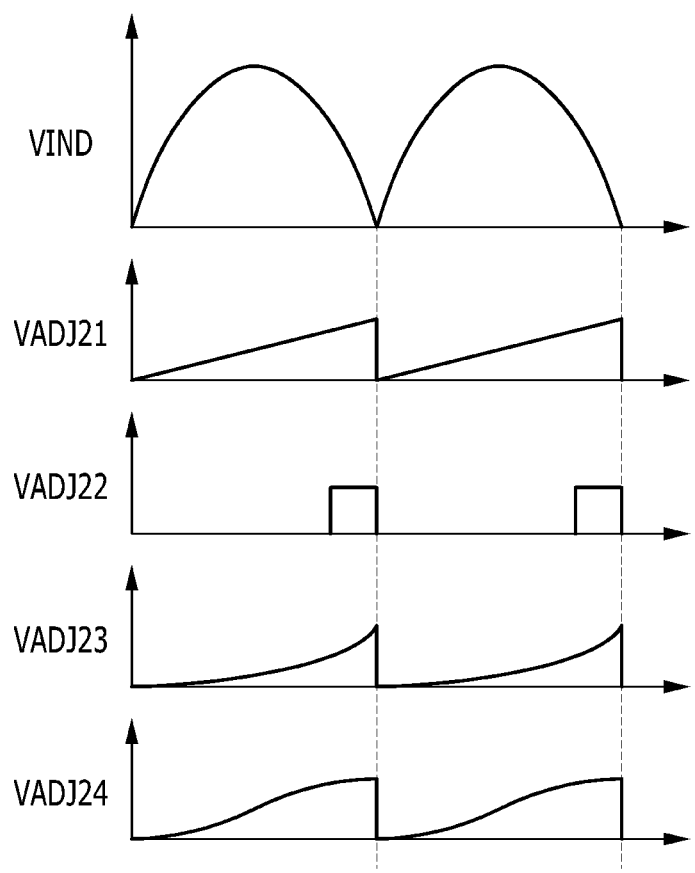
FIG. 5 is a waveform graph showing a control signal and an input detection voltage generated according to another example of the adjustment signal generator.

FIG. 5 is a waveform graph showing a control signal and an input detection voltage generated according to another example of the adjustment signal generator.

The adjustment signal generator 10 shown in FIG. 4 generates a reference signal VR synchronized with the input voltage VIN and generates an adjustment signal VDJ2 by multiplying the reference signal VR by the input peak voltage VINP corresponding to the peak of the input voltage VIN.

The adjustment signal generator 10 includes a reference signal generator 13 and a multiplier 14.

The reference signal generator 13 generates an adjustment reference signal VR synchronized with the input voltage VIN by sensing the input detection voltage VIND. The multiplier 14 multiplies the adjustment reference signal VR by the input peak voltage VINP to generate the adjustment signal VADJ2. Since the level of the filter current ICF is changed according to the input voltage VIN, the distortion amount of the filter current ICF can be compensated by multiplying the adjustment reference signal VR by the input peak voltage VINP corresponding to the peak of the input voltage VIN.

The adjustment reference signal VR is a signal asymmetric based on the peak of the input voltage VIN, which can be suitably set into a waveform for correcting distortion of the input current IIN by the filter current ICF. For example, FIG. 5 illustrates adjustment signals VADJ21 to VADJ24 generated respectively based on four waveforms of the adjustment reference signal VR. These are provided only as examples for describing the adjustment signal VADJ2 output from the multiplier 14 and should not be construed as limiting the present disclosure.

As shown in FIG. 5, the adjustment signals VADJ21 to VADJ24 have the same frequency in synchronization with the input detection voltage VIND. For example, the adjustment signal VADJ21 has a waveform that linearly increases for one cycle of the input detection voltage VIND, the adjustment signal VADJ22 has a constant level for a certain period of one cycle of the input detection voltage VIND, and the adjustment signal VADJ23 and the adjustment signal VADJ24 have waveforms that non-linearly increase for one cycle of the input detection voltage VIND.

Waveforms of the adjustment signals VADJ21 to VADJ24 shown in FIG. 5 are examples of waveforms for correcting distortion of the input current IIN by the filter current ICF asymmetrically based on the peak of input voltage VIN.

Hereinafter, examples of the duty generator 20 in a voltage mode will be described with reference to FIGS. 6 to 8.

In the voltage mode, feedback information may be defined by a voltage (hereinafter, referred to as "error voltage") generated by compensating the difference between a voltage corresponding to the output voltage VO and a predetermined reference voltage, and a control signal may be a signal (hereinafter, referred to as a "sawtooth wave signal") synchronized with a switching frequency of the power switch M.

Figure 6:
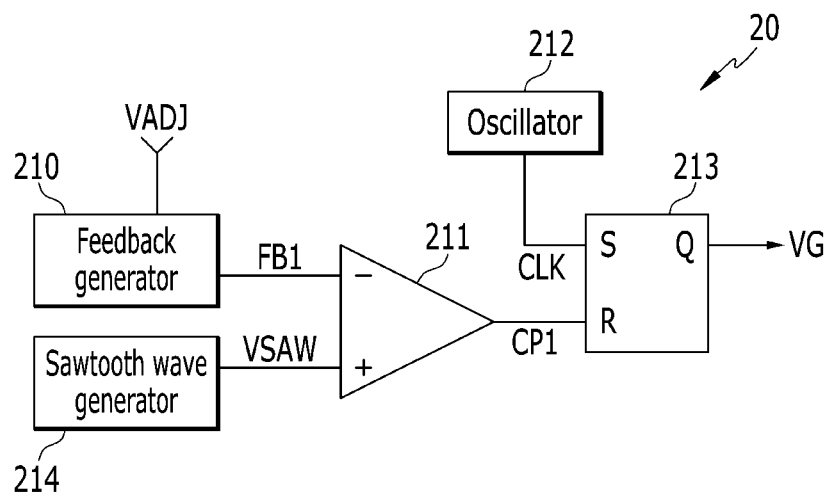
FIG. 6 is a diagram illustrating an example of a duty generator according to the present embodiment.

FIG. 6 is a diagram illustrating an example of a duty generator according to the present embodiment.

The duty generator 20 shown in FIG. 6 generates a feedback signal FB1 by correcting feedback information according to an adjustment signal VADJ. As shown in FIG. 6, the duty generator 20 includes a feedback generator 210, a comparator 211, an oscillator 212, an SR flip-flop 213 and a sawtooth wave generator 214.

The feedback generator 210 generates an error voltage and generates a feedback signal FB1 by adding the adjustment signal VADJ to the error voltage.

The sawtooth wave generator 214 generates a sawtooth wave signal VSAW that increases with a predetermined slope in synchronization with a switching cycle of the power switch M. For example, the sawtooth wave generator 214 may generate a sawtooth wave signal VSAW that increases with a predetermined slope for the switching cycle from the turn-on time of the power switch M.

The comparator 211 generates a control output CP1 according to a result of comparison between the feedback signal FB1 and the sawtooth wave signal VSAW.

The comparator 211 outputs a high level when an input of a non-inverting terminal (+) is equal to or higher than an input of an inverting terminal (−) and outputs a low level when the input of the non-inverting terminal (+) is lower than the input of the inverting terminal (−). In addition to the comparator 211, the other following exemplary comparators also perform the same operation as the comparator 211.

The oscillator 212 generates a clock signal CLK for controlling the switching frequency of the power switch M.

The SR flip-flop 213 increases the gate voltage VG to a high level in synchronization with a rising edge of the clock signal CLK input to the set terminal S and decreases the gate voltage VG to a low level in synchronization with a rising edge of the control output CP1 input to a reset terminal R. The gate voltage VG is output through the output terminal Q of the SR flip-flop 213.

From the rising edge timing of the clock signal CLK, the power switch M is turned on and the sawtooth wave signal VSAW increases. When the increasing sawtooth wave signal VSAW reaches the feedback signal FB1, the comparator 211 generates a high level of control output CP1. As a result, the power switch M is turned off.

When the feedback signal FB1 is generated by adding the adjustment signal VADJ1 shown in FIG. 3 to the error voltage, the feedback signal FB1 decreases at the beginning point of one cycle of the input voltage VIN and increases for one cycle of the input voltage VIN. As a result, a period at which the sawtooth wave signal VSAW reaches the feedback signal FB1 for one cycle of the input voltage VIN gradually increases and the on-period of the power switch M thus gradually increases.

Comparing one cycle of SMPS current according to the prior art wherein no adjustment signal VADJ is used, with one cycle of the SMPS current ISMPS according to the present embodiment, the SMPS current ISMPS according to the present embodiment is low for one half HP1 of one cycle (FIG. 3) and a high for the other half HP2 of the one cycle, as compared to the conventional SMPS current. The difference between two currents gradually decreases for the one half cycle HP1 and the difference between two currents gradually increases for the other half cycle HP2.

Figure 7:
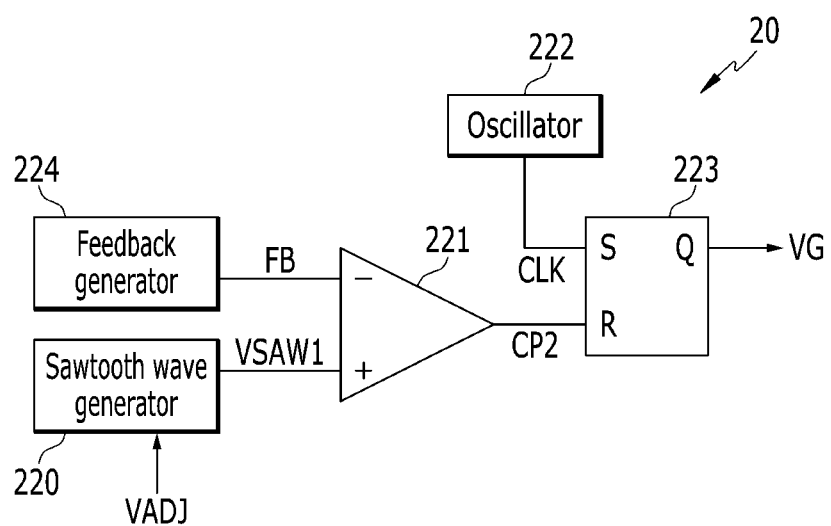
FIG. 7 is a diagram illustrating another example of the duty generator according to the present embodiment.

FIG. 7 is a diagram illustrating another example of the duty generator according to the present embodiment.

The duty generator 20 shown in FIG. 7 generates a sawtooth wave signal VSAW1 according to an adjustment signal VADJ. As shown in FIG. 7, the duty generator 20 includes a feedback generator 224, a comparator 221, an oscillator 222, an SR flip-flop 223 and a sawtooth wave generator 220.

The SR flip-flop 223 increases the gate voltage VG to a high level in synchronization with a rising edge of the clock signal CLK of the oscillator 222 input to the set terminal S and decreases the gate voltage VG to a low level in synchronization with a rising edge of a control output CP2 of the comparator 221 input to the reset terminal R. The gate voltage VG is output through the output terminal Q of the SR flip-flop 223.

The feedback generator 224 generates an error voltage and generates a feedback signal FB based on the error voltage.

The sawtooth wave generator 220 may generate a sawtooth wave signal VSAW1 that increases with a slope according to the adjustment signal VADJ in synchronization with a switching cycle of the power switch M, or may generate a sawtooth wave signal VSAW1 that increases from a level according to the adjustment signal VADJ.

For example, when the sawtooth wave generator 220 controls the slope of the sawtooth wave signal VSAW1 according to the adjustment signal VADJ, the sawtooth wave generator 220 controls variation in slope of the sawtooth wave signal VSAW1 in a direction reverse to the variation direction of the adjustment signal VADJ. That is, when the adjustment signal VADJ increases, as shown in FIG. 3, the increasing slope of the sawtooth wave signal VSAW1 gradually decreases. As a result, a period at which the sawtooth wave signal VSAW1 reaches the feedback signal FB for one cycle of the input voltage VIN gradually increases and the on-period of the power switch M thus gradually increases.

Alternatively, when the sawtooth wave generator 220 controls a level of the sawtooth wave signal VSAW1 according to the adjustment signal VADJ, the sawtooth wave generator 22 controls variation of beginning level of the sawtooth wave signal VSAW1 in a direction reverse to the conversion direction of the adjustment signal VADJ. That is, when the adjustment signal VADJ increases, as shown in FIG. 3, a level of the beginning point of increase of the sawtooth wave signal VSAW1 gradually decreases. As a result, a period at which the sawtooth wave signal VSAW1 reaches the feedback signal FB for one cycle of the input voltage VIN gradually increases and the on-period of the power switch M thus gradually increases.

Figure 8:
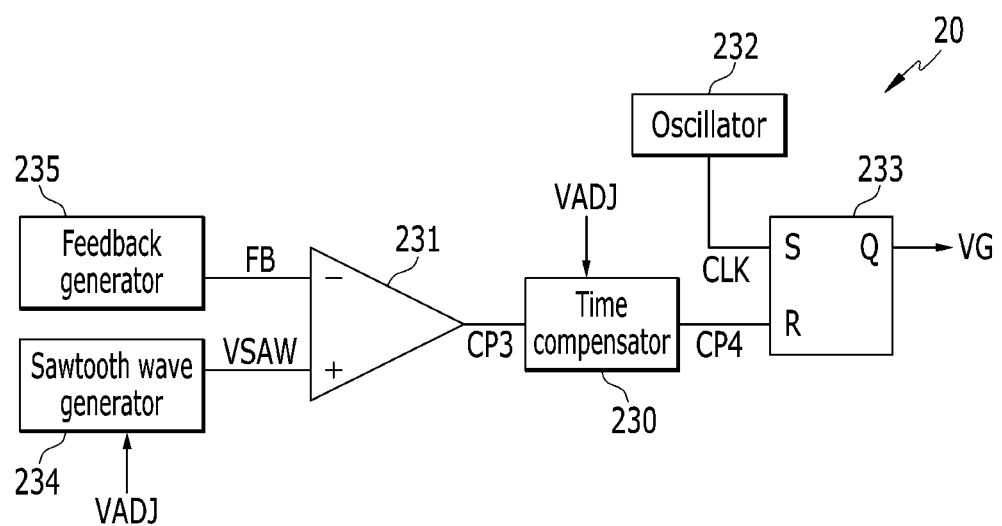
FIG. 8 is a diagram illustrating another example of the duty generator according to the present embodiment.

FIG. 8 is a diagram illustrating another example of the duty generator according to the present embodiment.

The duty generator 20 shown in FIG. 8 generates a compensation control output CP4 by correcting a control output CP3 according to adjustment signal VADJ. As shown in FIG. 8, the duty generator 20 includes a time compensator 230, a comparator 231, an oscillator 232, an SR flip-flop 233, a sawtooth wave generator 234 and a feedback generator 235.

The feedback generator 235 generates an error voltage and generates a feedback signal FB based on the error voltage. The sawtooth wave generator 234 generates a sawtooth wave signal VSAW that increases with a predetermined slope for each switching cycle of the power switch M. The comparator 231 generates the control output CP3 according to the result of comparison between the feedback signal FB and the sawtooth wave signal VSAW. The oscillator 232 generates a clock signal CLK for controlling the switching frequency of the power switch M.

The time compensator 230 determines a compensation period based on the adjustment signal VADJ and delays the control output CP3 by at least one switching cycle and the compensation period to generate the compensation control output CP4.

For example, the time compensator 230 receives the adjustment signal VADJ and calculates information associated with the compensation period corresponding to the adjustment signal VADJ (hereinafter, referred to as "compensation period information" (COMT)). The time compensator 230 delays the control output CP3 by the sum of the compensation period based on the compensation period information COMT and one switching cycle, to generate the compensation control output CP4. The period delayed by the time compensator 230 is not limited to the sum of the compensation period and one switching cycle and may be the sum of the compensation period and at least one switching cycle.

The SR flip-flop 233 increases the gate voltage VG to a high level in synchronization with a rising edge of the clock signal CLK input to the set terminal S and decreases the gate voltage VG to a low level in synchronization with a rising edge of the compensation control output CP4 input to the reset terminal R.

Figure 9:
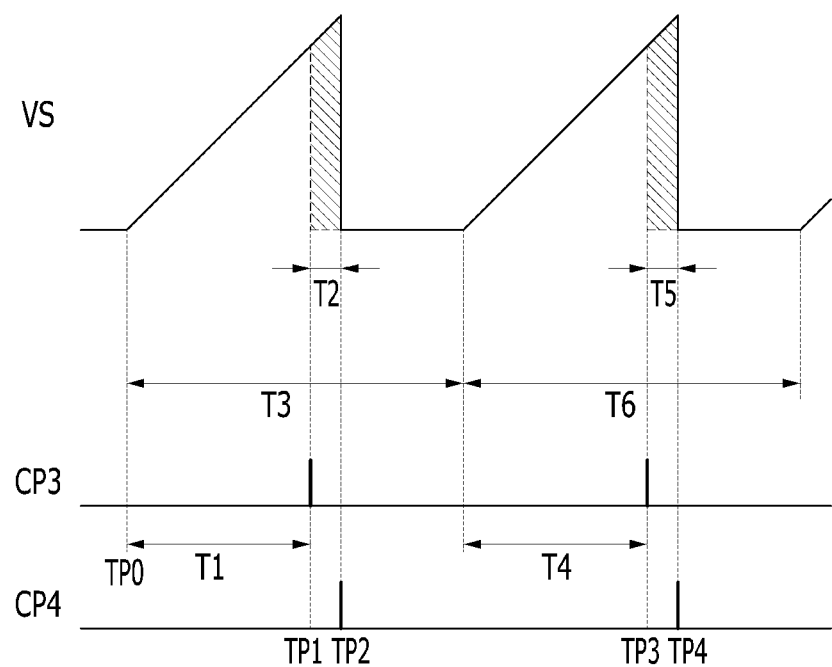
FIGS. 9 and 10 are waveform graphs of signals for describing an operation of the time compensator.
Figure 10:
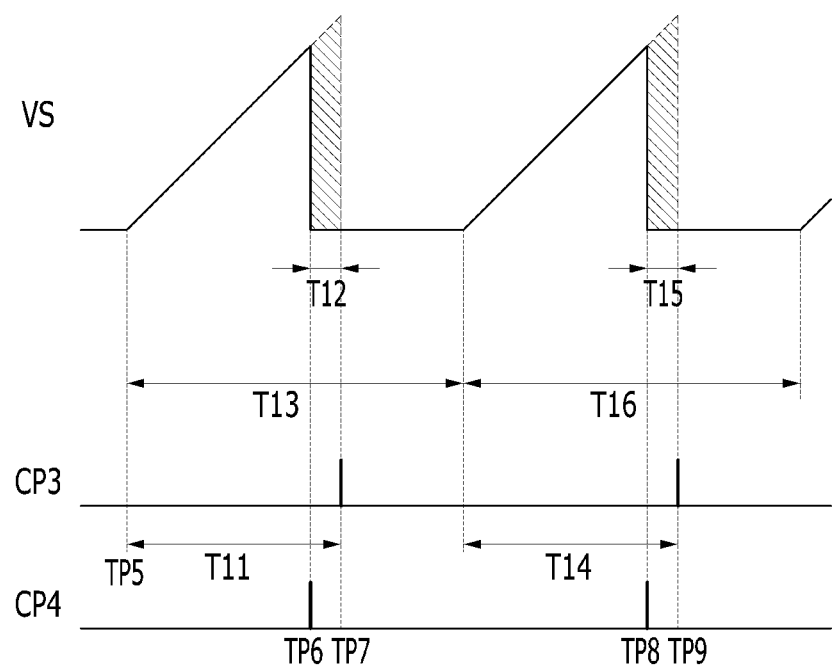

FIGS. 9 and 10 are waveform graphs of signals for describing an operation of the time compensator. A case in which the on-period of the power switch M is increased by the time compensator 230 will be described with reference to FIG. 9 and a case in which the on-period of the power switch M is decreased by the time compensator 230 will be described with reference to FIG. 10.

As shown in FIG. 9, at a time point TP0, the power switch M is turned on, the switch current IS begins to increase with a slope according to the input voltage VIN and the sensing voltage VS begins to increase. The short pulse of the control output CP3 generated before the time point TP0 is delayed by a period corresponding to the sum of one cycle of the power switch M and the compensation period T2 and the short pulse of the compensation control output CP4 is generated at a time point TP2.

For a period of the switching cycle T3, the short pulse of the control output CP3 is generated at a time point TP1. In the prior art wherein no time compensator 230 is used, for a period T1, the power switch M is turned on and switch current IS flows, whereas, in the present embodiment, the on-period of the power switch M is increased by the period T2 and more switch current IS flows. The switch current IS is increased by an amount corresponding to a region represented by oblique lines in FIG. 9 and the input current IIN is thus compensated.

For a period of the next switching cycle T6, the short pulse of the control output CP3 is generated at a time point TP3. The short pulse of the control output CP3 generated for the switching cycle T3 is delayed by a period corresponding to the sum of the switching cycle T3 and a compensation period T5, and the short pulse of the compensation control output CP4 is generated at a time point TP4.

In the prior art wherein no time compensator 230 is used, for a period T4, the power switch M is turned on and switch current IS flows, whereas in the present embodiment, the on-period of the power switch M is increased by the period T5 and more switch current IS flows. The switch current IS is increased by an amount corresponding to a region represented by oblique lines in FIG. 9 and the input current IIN is thus compensated.

FIG. 9 illustrates a sensing voltage VS, a control output CP3 and a compensation control output CP4 in a case in which the compensation period information COMT has a value increasing the turn-on period. A case in which the compensation period information COMT has a value decreasing the turn-on period will be described with reference to FIG. 10.

As shown in FIG. 10, at a time point TP5, the power switch M is turned on, switch current IS begins to increase with a slope according to the input voltage VIN and the sensing voltage VS begins to increase. The short pulse of the control output CP3 generated before the time point TP5 is delayed by a period corresponding to the difference between one cycle of the power switch M and the compensation period T12, and the short pulse of the compensation control output CP4 is generated at a time point TP6.

For a period of the switching cycle T13, the short pulse of the control output CP3 is generated at a time point TP7. In the prior art wherein no time compensator 230 is used, for a period T11, the power switch M is turned on and switch current IS flows, whereas, in the present embodiment, the on-period of the power switch M is decreased by the period T12 and less switch current IS flows. The switch current IS is decreased by an amount corresponding to a region represented by oblique lines in FIG. 10 and input current IIN is thus compensated.

For a period of the next switching cycle T16, the short pulse of the control output CP3 is generated at a time point TP9. The short pulse of the control output CP3 generated for the switching cycle T13 is delayed by a period corresponding to the difference between the switching cycle T13 and the compensation period T15, and the short pulse of the compensation control output CP4 is generated at a time point TP8.

In the prior art wherein no time compensator 230 is used, for the period T14, the power switch M is turned on and switch current IS flows, whereas, in the present embodiment, the on-period of the power switch M is decreased by the compensation period T15, and less switch current IS flows. The switch current IS is decreased by an amount corresponding to a region represented by oblique lines in FIG. 10 and input current IIN is thus compensated.

The time compensator 230 may generate compensation period information COMT according to adjustment signal VADJ using the following Equation 1.

$$COMT=K*(VADJ*TS)/(VIN*TON) \quad \text{[Equation 1]}$$

wherein TS is a switching cycle, VIN is an input voltage, TON is an on-period of the power switch M before compensation and K is a proportional constant of Equation 1.

Since the adjustment signal VADJ is a compensation value with respect to the distortion amount of the input current IIN by the filter current ICF, variation in switch current IS should correspond to the adjustment signal VADJ by compensation. Such relation may be represented by Equation 2 below.

$$VADJ=K1*(VSP1*TC)/TS \quad \text{[Equation 2]}$$

wherein VSP1 is a peak of sensing voltage VS for one switching cycle and TC is a compensation period and K1 is a proportional constant of Equation 2.

The peak of sensing voltage VS corresponds to the switch current IS that increases with a slope corresponding to the input voltage VIN for the on-period and is thus proportional to VIN*TON. If such relation is applied to Equation 2, the following Equation 3 may be represented.

$$VADJ=K2*(VIN*TON*TC)/TS \quad \text{[Equation 3]}$$

K2 is a proportional constant of Equation 3.

If Equation 3 is arranged with respect to compensation period TC, the following Equation 4 may be represented.

$$TC=K3*(VADJ*TS)/(VIN*TON) \quad \text{[Equation 4]}$$

wherein K3 is a proportional constant of Equation 4. If Equation 4 is arranged with respect to compensation period information COMT indicating compensation period TC, Equation 1 may be arranged.

The feedback signal FB1 may be generated according to adjustment signal VADJ such that the on-period compensated by the feedback signal FB1 of the feedback generator 210 described above follows Equation 4. Likewise, the sawtooth wave signal VSAW1 may be generated according to adjustment signal VADJ such that the on-period compensated by the sawtooth wave signal VSAW1 of the sawtooth wave generator 220 follows Equation 4.

Unlike the description with reference to FIGS. 8 to 10, control output may be generated without delay of one switching cycle.

Figure 11:
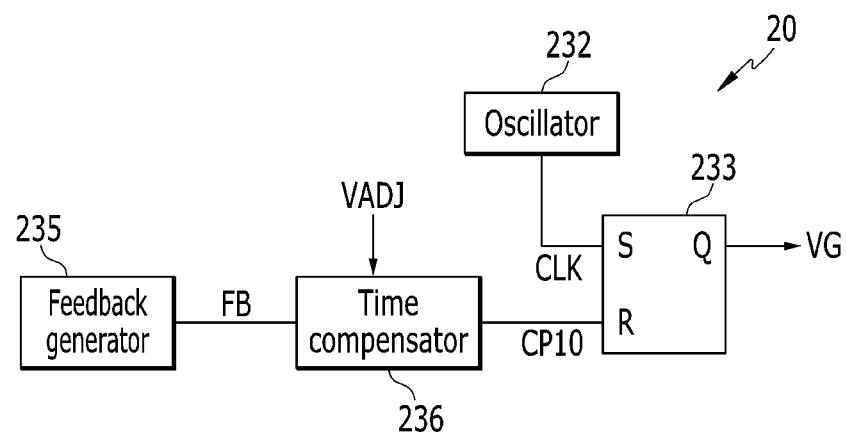
FIG. 11 is a diagram illustrating another example of the duty generator according to the present embodiment.

FIG. 11 illustrates another example of the duty generator according to the present embodiment.

In FIG. 11, same reference numbers are used to designate the same elements as in FIG. 8 and a detailed description is omitted.

As shown in FIG. 11, a time compensator 236 may generate time information corresponding to feedback information FB input from the feedback generator 235, generate time information corresponding to the adjustment signal VADJ and generate a control output CP10 based on result of addition of two time information. For example, the time compensator 236 may generate the control output CP10 to turn off the power switch M at the time point according to the addition result of two time information.

The time compensator 236 may generate time information corresponding to the feedback information FB in consideration of time margin for determining the turn-off time point of the power switch M. The time compensator 236 may generate two time information in the form of a digital signal.

Hereinafter, the duty generator 20 according to the embodiment in a current mode will be described.

In the current mode, feedback information may be a reference voltage for controlling the input current IIN and the control signal may be information associated with switch current IS flowing through the power switch M. The reference voltage may be a voltage depending on a load for regulation of the output voltage VO and the output current IO supplied to the load connected to the power factor correction circuit 1. That is, reference voltage means a reference for controlling duty of the power switch M for regulation and does not indicate only a fixed value.

Figure 12:
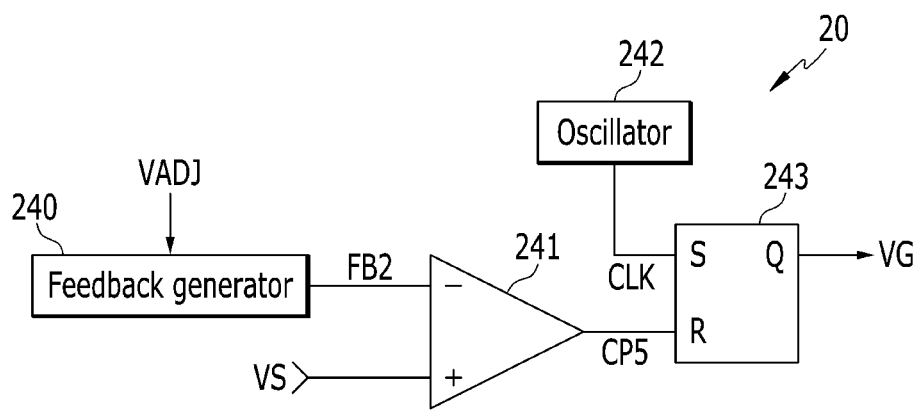
FIG. 12 is a diagram illustrating another example of the duty generator according to the present embodiment.

FIG. 12 is a diagram illustrating another example of the duty generator according to the present embodiment.

The duty generator 20 shown in FIG. 12 generates a feedback signal FB2 by correcting feedback information according to an adjustment signal VADJ. As shown in FIG. 12, the duty generator 20 includes a feedback generator 240, a comparator 241, an oscillator 242 and an SR flip-flop 243.

The feedback generator 240 generates the feedback signal FB2 by controlling the reference voltage according to adjustment signal VADJ. The feedback generator 240 may generate the feedback signal FB2 by adding the voltage determined according to adjustment signal VADJ to the reference voltage.

The comparator 241 generates a control output CP5 according to a result of comparison between the feedback signal FB2 and the sensing voltage VS.

The oscillator 242 generates a clock signal CLK for controlling the switching frequency of the power switch M.

The SR flip-flop 243 increases the gate voltage VG to a high level in synchronized with a rising edge of the clock signal CLK input to the set terminal S and decreases the gate voltage VG to a low level in synchronization with a rising edge of the control output CP5 input to a reset terminal R. The gate voltage VG is output through the output terminal Q of the SR flip-flop 243.

From the time point of the rising edge of the clock signal CLK, the power switch M is turned on and the sensing voltage VS increases. When the increasing sensing voltage VS reaches the feedback signal FB2, the comparator 241 generates a high level of control output CP5. As a result, the power switch M is turned off.

When the feedback signal FB2 is generated by adding the adjustment signal VADJ1 shown in FIG. 3 to the reference voltage, the feedback signal FB2 decreases at the beginning point of one cycle of the input voltage VIN and increases for one cycle of the input voltage VIN. As a result, a period at which the sensing voltage VS reaches the feedback signal FB1 for one cycle of the input voltage VIN gradually increases and the on-period of the power switch M thus gradually increases.

Comparing one cycle of SMPS current according to the prior art wherein no adjustment signal VADJ is used, with one cycle of the SMPS current ISMPS according to the present embodiment, the SMPS current ISMPS according to the present embodiment is low for one half HP1 of one cycle (FIG. 3) and a high for the other half HP2 of the one cycle, as compared to the conventional SMPS current. The difference between two currents gradually decreases for the one half cycle HP1 and the difference between two currents gradually increases for the other half cycle HP2.

Figure 13:
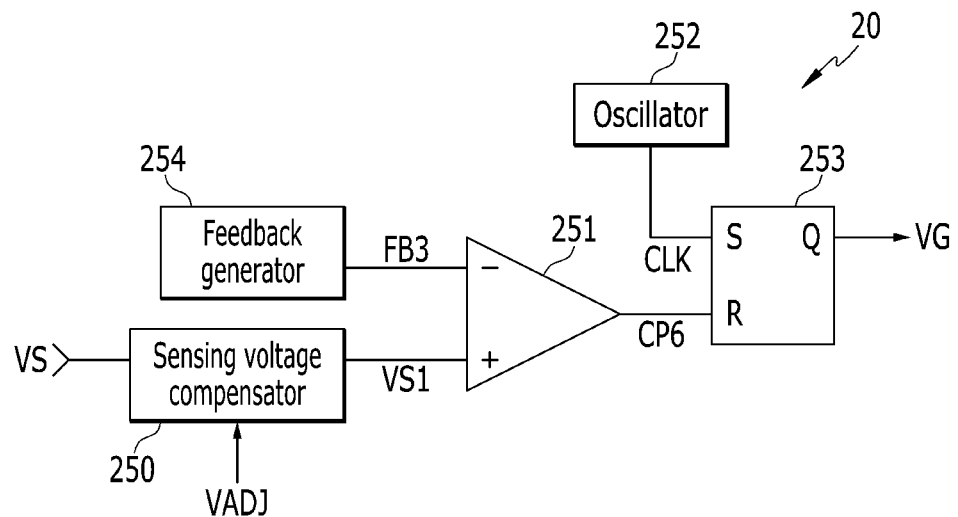
FIG. 13 is a diagram illustrating another example of the duty generator according to the present embodiment.

FIG. 13 is a diagram illustrating another example of the duty generator according to the present embodiment.

The duty generator 20 shown in FIG. 13 generates a sensing voltage VS1 according to an adjustment signal VADJ. As shown in FIG. 13, the duty generator 20 includes a feedback generator 254, a comparator 251, an oscillator 252, an SR flip-flop 253 and a sensing voltage compensator 250.

The SR flip-flop 253 increases the gate voltage VG to a high level in synchronization with a rising edge of the clock signal CLK of the oscillator 252 input to the set terminal S and decreases the gate voltage VG to a low level in synchronization with a rising edge of a control output CP6 of the comparator 251 input to the reset terminal R. The gate voltage VG is output through the output terminal Q of the SR flip-flop 253.

The feedback generator 254 generates a reference voltage and generates a feedback signal FB3 based on the reference voltage.

The sensing voltage compensator 250 generates a compensation sensing voltage VS1 by correcting the sensing voltage VS according to the adjustment signal VADJ.

For example, when the sensing voltage compensator 250 controls a slope of the sensing voltage VS according to the adjustment signal VADJ, the sensing voltage compensator 250 generates the compensation sensing voltage VS1 by controlling variation in slope of the sensing voltage VS in a direction reverse to a variation direction of the adjustment signal VADJ. The slope of the sensing voltage VS is determined depending on the input voltage VIN and the slope determined by the input voltage VIN may be controlled according to the adjustment signal VADJ.

For example, the increasing slope of the sensing voltage VS1 gradually decreases under the condition that the adjustment signal VADJ increases, as shown in FIG. 3, as compared to the prior art having no adjustment signal VADJ. As a result, a period at which the compensation sensing voltage VS1 reaches the feedback signal FB3 for one cycle of the input voltage VIN gradually increases, as compared to the prior art and on-period of the power switch M thus gradually increases.

Alternatively, when the sensing voltage compensator 250 controls a level of the sensing voltage VS according to adjustment signal VADJ, the sensing voltage compensator 250 generates a compensation sensing voltage VS1 by controlling variation of the beginning level of the sensing voltage VS in a direction reverse to the variation direction of the adjustment signal VADJ. That is, when the adjustment signal VADJ increases, as shown in FIG. 3, a level of the beginning point of increase of the compensation sensing voltage VS1 gradually decreases. As a result, a period at which the compensation sensing voltage VS1 reaches the feedback signal FB3 for one cycle of the input voltage VIN gradually increases and the on-period of the power switch M thus gradually increases.

Figure 14:
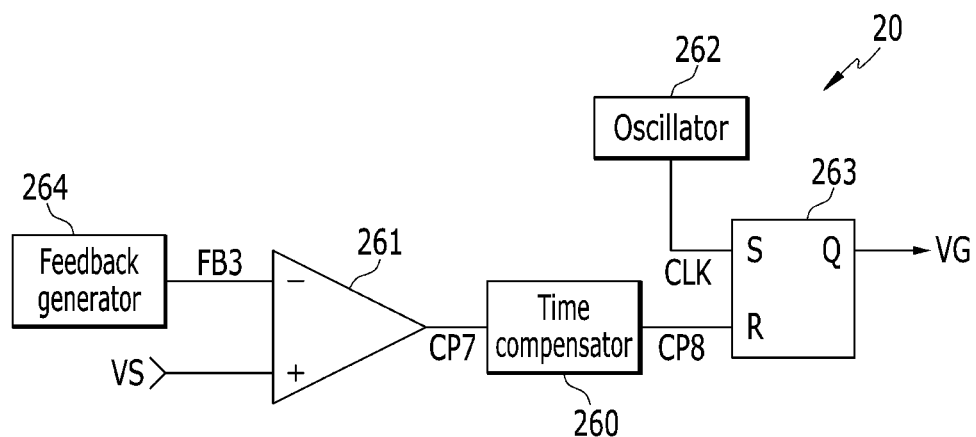
FIG. 14 is a diagram illustrating another example of the duty generator according to the present embodiment.

FIG. 14 is a diagram illustrating another example of the duty generator according to the present embodiment.

The duty generator 20 shown in FIG. 14 generates a compensation control output CP8 by correcting a control output CP7 according to adjustment signal VADJ. As shown in FIG. 14, the duty generator 20 includes a time compensator 260, a comparator 261, an oscillator 262, an SR flip-flop 263 and a feedback generator 264.

The feedback generator 264 generates a reference voltage and generates a feedback signal FB3 based on the reference voltage. The comparator 261 generates the control output CP7 according to a result of comparison between the feedback signal FB3 and the sensing voltage VS1. The oscillator 262 generates a clock signal CLK for controlling the switching frequency of the power switch M.

The time compensator 260 determines a compensation period based on the adjustment signal VADJ and delays the control output CP7 by at least one switching cycle and the compensation period to generate the compensation control output CP8.

The SR flip-flop 263 increases the gate voltage VG to a high level in synchronized with a rising edge of the clock signal CLK input to the set terminal S and decreases the gate voltage VG to a low level in synchronization with a rising edge of the compensation control output CP8 input to the reset terminal R.

The configuration and operation of the time compensator 260 are the same as those of the time compensator 230 in the voltage mode described above and a detailed description thereof is thus omitted.

Furthermore, the example of FIG. 11 may be applied to a current mode, as well.

Hereinafter, the duty generator 20 in an input current calculation mode will be described.

Figure 15:
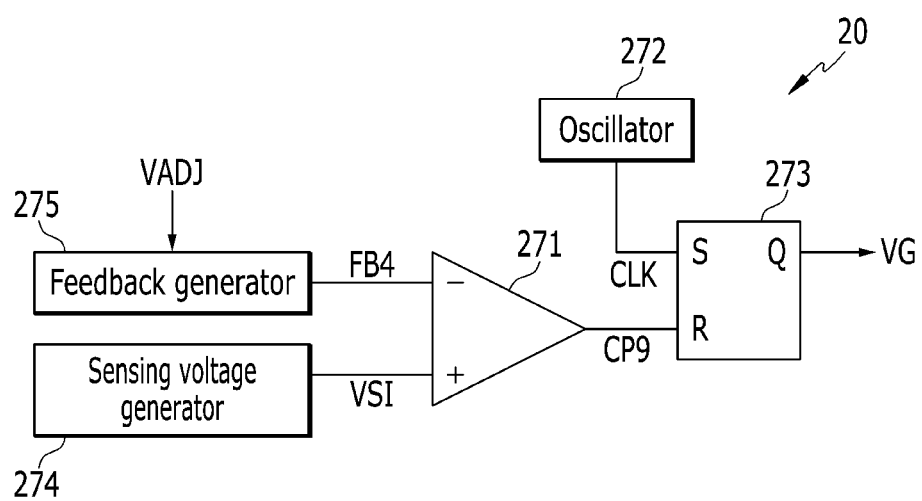
FIG. 15 is a diagram illustrating another example of the duty generator according to the present embodiment.

FIG. 15 is a diagram illustrating another example of the duty generator according to the present embodiment.

As shown in FIG. 15, the duty generator 20 includes a comparator 271, an oscillator 272, an SR flip-flop 273, a sensing voltage generator 274 and a feedback generator 275.

The sensing voltage generator 274 generates a sensing voltage VSI based on the total amount of the switch current IS for one switching cycle of the power switch M. For example, the sensing voltage generator 274 may generate the sensing voltage VSI by integrating the sensing voltage VS for one switching cycle of the power switch M.

The feedback generator 275 generates a feedback signal FB4 based on a result of multiplication of the sum of a predetermined reference voltage and the adjustment signal VADJ, by the switching cycle of the power switch M. The reference voltage may be a voltage depending on the input voltage VIN.

The SR flip-flop 273 increases the gate voltage VG to a high level in synchronization with a rising edge of the clock signal CLK of the oscillator 272 input to the set terminal S and decreases the gate voltage VG to a low level in synchronization with a rising edge of a control output CP9 of the comparator 271 input to the reset terminal R. The gate voltage VG is output through the output terminal Q of the SR flip-flop 273.

The input current IIN depends on the average of the switch current IS. The input current IIN may be estimated by dividing the total amount of the switch current IS for one switching cycle of the power switch M by the switching cycle. A mode for controlling a switching operation by comparing the input current IIN estimated with the reference voltage depending on the input voltage VIN is an input current calculation mode.

The duty generator 20 shown in FIG. 15 generates a sensing voltage VSI corresponding to the total amount of the switch current IS, generates a feedback signal FB4 by multiplying the sum of the reference voltage and the adjustment signal VADJ by the switching cycle, and controls duty based on a result of comparison between the sensing voltage VSI and the feedback signal FB4. As a result, the feedback signal FB4 decreases at the beginning point of one cycle of the input voltage VIN and increases for one cycle of the input voltage VIN. As a result, a period at which the sensing voltage VSI reaches the feedback signal FB4 for one cycle of the input voltage VIN gradually increases and the on-period of the power switch M thus gradually increases.

As such, the distortion amount of the input current IIN by the filter current ICF can be compensated by controlling the on-period of the power switch M, thereby making the waveform of the input current IIN similar to the waveform of the input voltage VIN. As a result, power factor can be improved.

While this disclosure has been described in detail in connection with exemplary embodiments, it is to be understood that the disclosure is not limited to the disclosed embodiments, but, on the contrary, is intended to cover various modifications and equivalent arrangements realized by those skilled in the art using the basic concept of the present disclosure defined in the appended claims.

What is claimed is:

1. A power factor correction circuit comprising:
    adjustment signal generator that is configured to receive an input detection voltage that corresponds to an input voltage of a power supply and to generate an adjustment signal, the adjustment signal having a waveform that is asymmetric relative to a peak of a full-wave rectified waveform of the input voltage; and
    a duty generator that is configured to turn on a power switch of the power supply in accordance with a clock signal, to generate a compensation signal by comparing a feedback signal with a reference signal, to generate an adjusted compensation signal by adjusting the compensation signal using the adjustment signal, and to turn off the power switch in response to the adjusted compensation signal, the adjusted compensation signal being a delayed version of the compensation signal,
    wherein the duty generator comprises a time compensator that is configured to generate the adjusted compensation signal by delaying the compensation signal by a sum of a compensation period and at least one switching cycle of the power switch, the compensation period being determined based on the adjustment signal.

2. The power factor correction circuit of claim 1, wherein the adjustment signal generator is configured to generate the adjustment signal by differentiating the input voltage.

3. The power factor correction circuit of claim 1, wherein the feedback signal corresponds to an output voltage of the power supply, the reference signal is a sawtooth wave signal, and the duty generator comprises:
    a feedback generator that is configured to generate the feedback signal; and
    a sawtooth wave generator that is configured to generate the sawtooth wave signal,
    wherein the duty generator is configured to generate the adjusted compensation signal by comparing the feedback signal to the sawtooth wave signal.

4. The power factor correction circuit of claim 3, wherein the feedback generator is configured to generate the feedback signal by adding the adjustment signal to an error signal corresponding to an error between the output voltage of the power supply and a reference voltage.

5. The power factor correction circuit of claim 3, wherein the sawtooth wave generator is configured to adjust a slope of the sawtooth wave signal according to the adjustment signal.

6. The power factor correction circuit of claim 3, wherein the sawtooth wave generator is configured to increase from a level according to the adjustment signal.

7. The power factor correction circuit of claim 3, wherein the duty generator further comprises a time compensator that is configured to delay the adjusted compensation signal according to the adjustment signal.

8. The power factor correction circuit of claim 1, wherein the reference signal corresponds to a current through the power switch, and the duty generator is configured to generate the adjusted compensation signal by adding the adjustment signal to the feedback signal.

9. The power factor correction circuit of claim 1, wherein the duty generator comprises:
    a feedback generator that is configured to generate the feedback signal; and
    a sensing voltage compensator that is configured to generate the reference signal by adjusting a sense voltage that corresponds to a current through the power switch using the adjustment signal.

10. The power factor correction circuit of claim 1, wherein the adjustment signal increases throughout a cycle of the input detection voltage.

11. A method of operation of a power factor correction circuit, the method comprising:
    receiving an input detection voltage that corresponds to an input voltage of a power supply;
    generating an adjustment signal having a waveform that is asymmetric relative to a peak of a full-wave rectified waveform of the input voltage;
    turning on a power switch of the power supply in accordance with a clock signal;
    generating a compensation signal by comparing a feedback signal with a reference signal;
    generating an adjusted compensation signal by delaying the compensation signal by a sum of a compensation period and at least one switching cycle of the power switch, the compensation period being determined based on the adjustment signal; and
    turning off the power switch in response to the adjusted compensation signal.

12. The method of claim 11, wherein generating the adjustment signal comprises:
    generating a differentiated voltage by differentiating the input voltage.

13. The method of claim 11, wherein the feedback signal corresponds to an output voltage of the power supply, the reference signal is a sawtooth wave signal, and the method further comprises:
    generating the feedback signal by adding the adjustment signal to an error signal corresponding to an error between the output voltage of the power supply and a reference voltage; and
    comparing the feedback signal to the sawtooth wave signal to generate the adjusted compensation signal.

14. The method of claim 11, wherein the feedback signal corresponds to an output voltage of the power supply, the reference signal is a sawtooth wave signal, and the method further comprises:
    adjusting the sawtooth wave signal according to the adjustment signal.

15. The method of claim 11, wherein the reference signal corresponds to a current through the power switch, and the adjusted compensation signal is generated by adding the adjustment signal to the feedback signal.

16. The method of claim 11, further comprising:
    generating a sense voltage that corresponds to a current through the power switch; and
    generating the reference signal by adjusting the sense voltage according to the adjustment signal.

17. A power factor correction circuit comprising:
- a differentiator that is configured to receive an input detection voltage that corresponds to an input voltage of a power supply and to differentiate the input detection voltage to generate a differentiated signal; and
- a duty generator that is configured to receive an adjustment signal that is based on the differentiated signal, to generate a compensation signal by comparing a feedback signal with a reference signal, to generate an adjusted compensation signal by adjusting the compensation signal using the adjustment signal, and to turn off the power switch in response to the adjusted compensation signal, the adjusted compensation signal being a delayed version of the compensation signal,
- wherein the duty generator comprises a time compensator that is configured to generate the adjusted compensation signal by delaying the compensation signal by a sum of a compensation period and at least one switching cycle of the power switch, the compensation period being determined based on the adjustment signal.

* * * * *